(12) United States Patent
Légaré

(10) Patent No.: US 11,724,614 B2
(45) Date of Patent: Aug. 15, 2023

(54) ELECTRICAL BREAK-AWAY SYSTEM FOR ELECTRIC VEHICLE CHARGING STATION

(71) Applicant: ADDÉNERGIE TECHNOLOGIES INC., Quebec (CA)

(72) Inventor: Sylvain Légaré, Lac-Sergent (CA)

(73) Assignee: ADDÉNERGIE TECHNOLOGIES INC., Quebec (CA)

( * ) Notice: Subject to any disclaimer, the term of this patent is extended or adjusted under 35 U.S.C. 154(b) by 219 days.

(21) Appl. No.: 17/225,735

(22) Filed: Apr. 8, 2021

(65) Prior Publication Data

US 2022/0324343 A1  Oct. 13, 2022

(51) Int. Cl.
  *B60L 53/31* (2019.01)
  *B60L 53/18* (2019.01)
  *B60L 53/16* (2019.01)

(52) U.S. Cl.
  CPC .............. *B60L 53/31* (2019.02); *B60L 53/16* (2019.02); *B60L 53/18* (2019.02)

(58) Field of Classification Search
  CPC ................................. B60L 53/31; B60L 53/16
  USPC ......................................................... 320/109
  See application file for complete search history.

(56) References Cited

U.S. PATENT DOCUMENTS

| | | |
|---|---|---|
| 3,521,413 A | 7/1970 | Scott et al. |
| 5,060,437 A | 10/1991 | Parsons et al. |
| 5,306,999 A | 4/1994 | Hoffman |
| 6,056,471 A | 5/2000 | Dinitz |
| 7,492,064 B1 | 2/2009 | Vaughan |
| 7,980,533 B1 | 7/2011 | Anderson et al. |
| 8,710,372 B2 | 4/2014 | Kamer |
| 9,130,359 B2 | 9/2015 | Kushalappa et al. |
| 9,627,921 B2 | 4/2017 | Laheutra |
| 10,044,137 B2 | 8/2018 | Petrie et al. |

(Continued)

FOREIGN PATENT DOCUMENTS

| | | |
|---|---|---|
| AT | 511533 B1 | 2/2015 |
| CN | 210337615 U | 4/2020 |

(Continued)

OTHER PUBLICATIONS

Ideal Shield: "Electric Vehicle Charging Station", https://www.idealshield.com/products/parkinglot/-; published on Nov. 30, 2020.

(Continued)

*Primary Examiner* — Suchin Parihar
(74) *Attorney, Agent, or Firm* — Rowand LLP

(57) ABSTRACT

An electric vehicle charging station is provided. The electric vehicle charging station is configured to safely disconnect power during an impact. The electric vehicle charging station includes a mechanical break-away coupling connecting a base section and a charger section, the mechanical break-away coupling including a failure point to allow the charger section to break away from the base section. The electric vehicle charging station also includes an electrical break-away coupling connecting at least one wire extending from the base section to the charger section, the electrical break-away coupling configured to disconnect the at least one wire from the charger section when the charger section breaks away from the base section. A pedestal for an electric vehicle charging station is also provided.

18 Claims, 10 Drawing Sheets

(56) References Cited

U.S. PATENT DOCUMENTS

| | | | | |
|---|---|---|---|---|
| 2012/0129369 A1* | 5/2012 | Bogart | .................... | B60L 58/10 |
| | | | | 439/153 |
| 2013/0187601 A1* | 7/2013 | Petrie | ................... | H01R 13/635 |
| | | | | 320/109 |
| 2013/0221917 A1 | 8/2013 | Chandrakant et al. | | |
| 2013/0241479 A1* | 9/2013 | Wright, Jr. | ............... | H02H 5/10 |
| | | | | 141/94 |
| 2013/0257373 A1 | 10/2013 | Mallon, IV et al. | | |
| 2016/0204541 A1* | 7/2016 | Mayo | ...................... | F21V 23/06 |
| | | | | 439/620.02 |
| 2017/0126033 A1 | 5/2017 | Dudar | | |
| 2018/0342844 A1* | 11/2018 | Broere | ................... | B60L 53/16 |
| 2020/0009967 A1* | 1/2020 | Stevens | .................... | H02H 5/10 |
| 2020/0189412 A1 | 6/2020 | Rauma | | |

FOREIGN PATENT DOCUMENTS

| | | |
|---|---|---|
| DE | 201810131005 A1 | 6/2020 |
| JP | 2010263666 A1 | 11/2020 |
| WO | 2012006597 | 1/2012 |
| WO | 2012034225 | 3/2012 |

OTHER PUBLICATIONS

EVSE: "EVSE Control Module", http://evsellc.com/, published on Nov. 30, 2020.
US Department of Energy: "Plug in Electric Vehicle Handbook", published on Apr. 1, 2012.
International Search Report & Written Opinion dated Jun. 27, 2022; WIPO Application No. PCT/2022/050488.

* cited by examiner

ELECTRICAL BREAK-AWAY SYSTEM FOR ELECTRIC VEHICLE CHARGING STATION

FIELD

This application relates to electric vehicle charging stations and, more particularly, to systems for providing electrical and mechanical break-away upon certain impact.

BACKGROUND

An electric vehicle (EV) charging station is an element of infrastructure that supplies direct current (DC) or alternating current (AC) electric energy for the recharging of electric vehicles, such as plug-in battery electric vehicles, including electric cars, trucks, buses, and other vehicles including high and low range electric vehicles and plug-in hybrids. EV charging stations are sometimes provided on-street or in areas near vehicular and pedestrian traffic. The term "electric vehicle charging stations", as used herein, may include both Level 2 chargers and Level 3 charging stations. Some electric vehicle charging stations may be or include electric vehicle supply equipment (EVSE) that cooperates with on-vehicle charging equipment.

Upon high-speed impact by a vehicle, or under stress from another force in the environment, an EV charging station may physically break or become damaged. Often, to prevent such damage, a protective element such as a bollard may be installed near an EV charging station. In some situations, use of a bollard or other means of physically shielding an EV charging station from accidental vehicle collisions is not possible or not desirable, or insufficient. However, without such physical shielding, or if such physical shielding is insufficient, the collapse of a charging station may present a considerable threat to nearby pedestrians or other vehicles, both through a potential physical collision and through damage to the electric wiring within the station. Exposed, or otherwise damaged, electric wiring may lead to hazards such as fires and electrocution.

BRIEF DESCRIPTION OF THE DRAWINGS

Embodiments are described in detail below, with reference to the following drawings.

Like reference numerals are used in the drawings to denote like elements and features.

DETAILED DESCRIPTION OF EXAMPLE EMBODIMENTS

Figure 1:
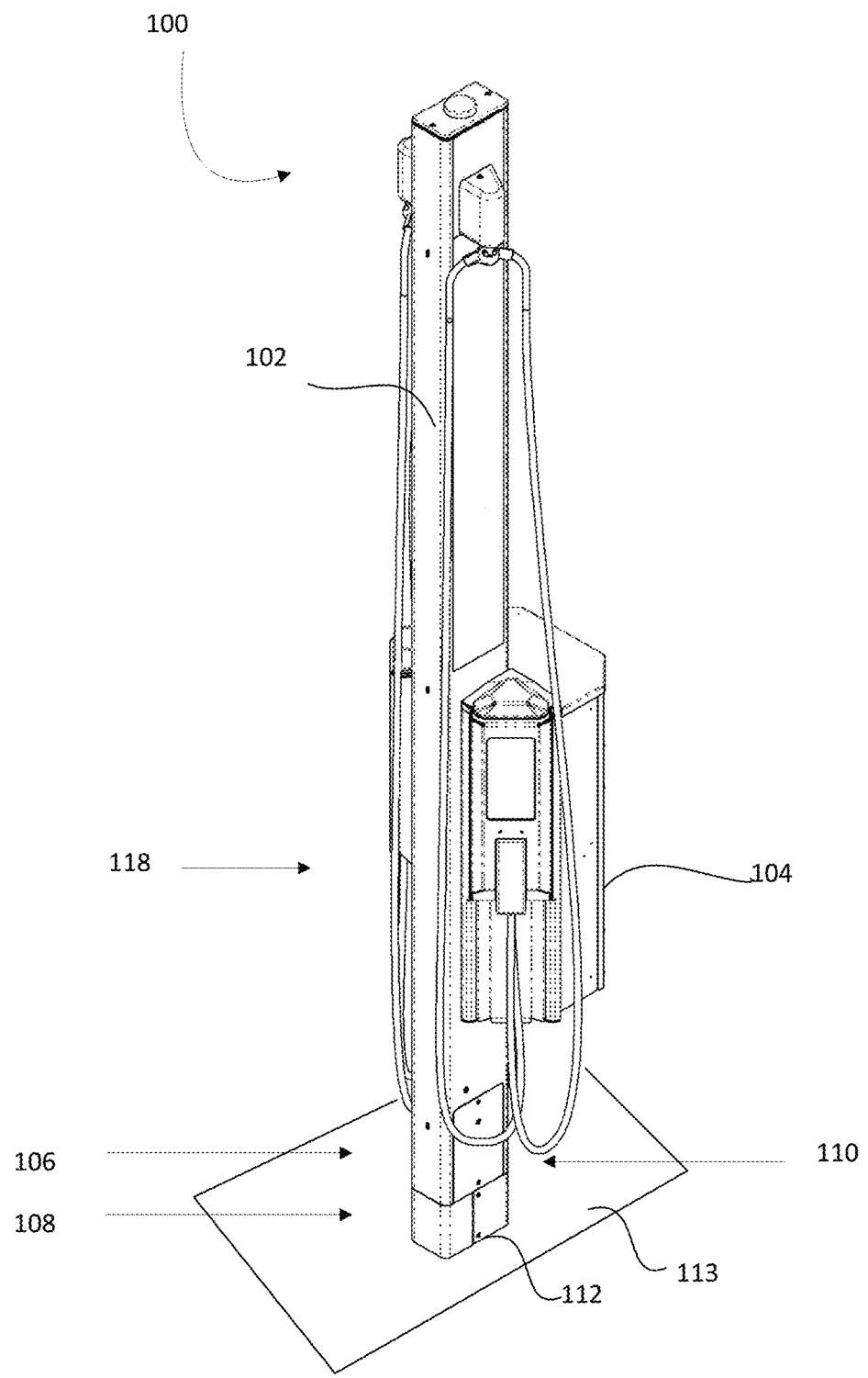
FIG. 1 is a perspective view of an electric vehicle (EV) charging station, in accordance with an example of the present application.

The popularity of electric vehicles has given rise to the establishment of a growing number of curbside EV charging stations or stations otherwise located near vehicular and/or pedestrian traffic. While curbside EV charging stations bring convenience to drivers, they also present certain safety hazards to pedestrians. In order to provide safety to pedestrians, an EV charging station may be designed to withstand a low-speed impact with a vehicle, such as may be associated with an accidental impact during parking. At the same time, an EV charging station may be designed to fall safely during a high-speed impact. The EV charging station may, for example, be designed to fall towards the point of impact (i.e., onto the vehicle) rather than away from the vehicle where there may be pedestrians or other vehicles.

Furthermore, once a charger post has broken, a safe EV charging station may be designed to automatically de-energize to reduce the risk of electrocution to pedestrians or vehicle occupants.

Described herein are stand-alone EV charging stations that provide both safe mechanical break-away and electrical de-energization upon vehicle impact. Also described herein are EV charging station pedestals that may adapt traditional EV charging stations such that they may provide the same.

According to the subject-matter of the present application, there may be provided an electric vehicle charging station configured to safely disconnect power during an impact. The electric vehicle charging station includes a mechanical break-away coupling connecting a base section and a charger section. The mechanical break-away coupling includes a failure point to allow the charger section to break away from the base section. The electric vehicle charging station also includes an electrical break-away coupling for connecting at least one wire extending from the base section to the charging station. The electrical break-away coupling may be configured to disconnect the at least one wire from the charging station when the charging station breaks away from the base section.

In some implementations, the failure point may be disposed within six inches of a bumper height for a roadway.

In some implementations, the electrical break-away coupling may include a non-locking connector.

In some implementations, the electrical break-away coupling may be a mating electrical connector having a male end coupled to the charger section and a female end coupled to the at least one wire.

In some implementations the at least one wire may include no more than three inches of slack to cause immediate disconnection of the at least one wire when the charger section breaks away from the base section.

In some implementations, the electric vehicle charging station may further include an open conduit for routing the at least one wire. The open conduit may extend from the base section towards the charger section. An end of the conduit end nearest the charger section may create a pivot for the at least one wire to accelerate the disconnection of the at least one wire from the charger section.

In some implementations, the at least one wire may be coupled to the base section.

In some implementations, the electrical break-away coupling may cause disconnection of the at least one wire from the charger section when a force is applied to the at least one wire that is above 40 Lbf (pound-force).

In some implementations the electrical break-away coupling may resist disconnection of the at least one wire from the charger section when a force is applied to the at least one wire that is less than 10 Lbf.

In some implementations, the charger section may break away from the base section in a direction of descent corresponding to a side of the impact.

In another aspect, there may be provided a pedestal for an electric vehicle charging station for providing safe disconnection of power to the charging station during an impact to the pedestal. The pedestal includes a base section and an interface section for connecting the base section to the charging station. The interface section includes a mechanical break-away coupling including a failure point to allow the charging station to break away from the base section and an electrical break-away coupling for connecting at least one wire extending from the base section to the charging station. The electrical break-away coupling may be configured to disconnect the at least one wire from the charging station when the charging station breaks away from the base section.

In some implementations, the failure point may be disposed within six inches of a bumper height for a roadway.

In some implementations, the electrical break-away coupling may include a non-locking connector.

In some implementations, the electrical break-away coupling may be a mating electrical connector having a male end coupled to the at least one bottom wire and a female end coupled to the at least one top wire.

In some implementations, the at least one bottom wire may include no more than three inches of slack to cause immediate disconnection of the at least one bottom wire from the at least one top wire when the charging station breaks away from the base section.

In some implementations, the pedestal may further include an open conduit for routing the at least one wire. The open conduit may extend from the base section towards the charger section. An end of the open conduit nearest the charger section creates a pivot for the at least one wire to accelerate the disconnection of the at least one wire from the charger section.

In some implementations, the at least one bottom wire may be coupled to the base section.

In some implementations, the electrical break-away coupling may cause disconnection of the at least one bottom wire from the at least one top wire when a force is applied to the at least one bottom wire that is above 40 Lbf.

In some implementations, the electrical break-away coupling may resist disconnection of the at least one bottom wire from the at least one top wire when a force is applied to the at least one bottom wire that is less than 10 Lbf.

In some implementations, the charging station may break away from the base section in a direction of descent corresponding to a side of impact.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Reference is made to FIG. 1, which illustrates a perspective view of an EV charging station, in accordance with an example of the present application. The EV charging station 100 includes one or more EV chargers 104. The EV chargers 104 may be mounted to a charger post 102 in some implementations. An interface section 110 of the charger post 102 includes an electrical break-away section 106 and a mechanical break-away section 108. The interface section 110 is situated between the one or more EV chargers 104 and a curbside base 112 (which may also be referred to as a groundside base, base or base section). The curbside base 112 may, in some implementations, be entirely or partially buried. That is, the curbside base 112 may be installed in or under ground 113. The curbside base 112 may, for example, be installed in concrete or asphalt. Since the curbside base 112 is illustrated in FIG. 1 as being at least partially buried, the curbside base 112 is not entirely visible in FIG. 1. A buried portion of the curbside base 112 is, however, illustrated in FIG. 10 which will be described in greater detail below.

The charger post 102 is securely mounted to the curbside base 112. The curbside base 112 may be a concrete foundation, for example.

Figure 2:
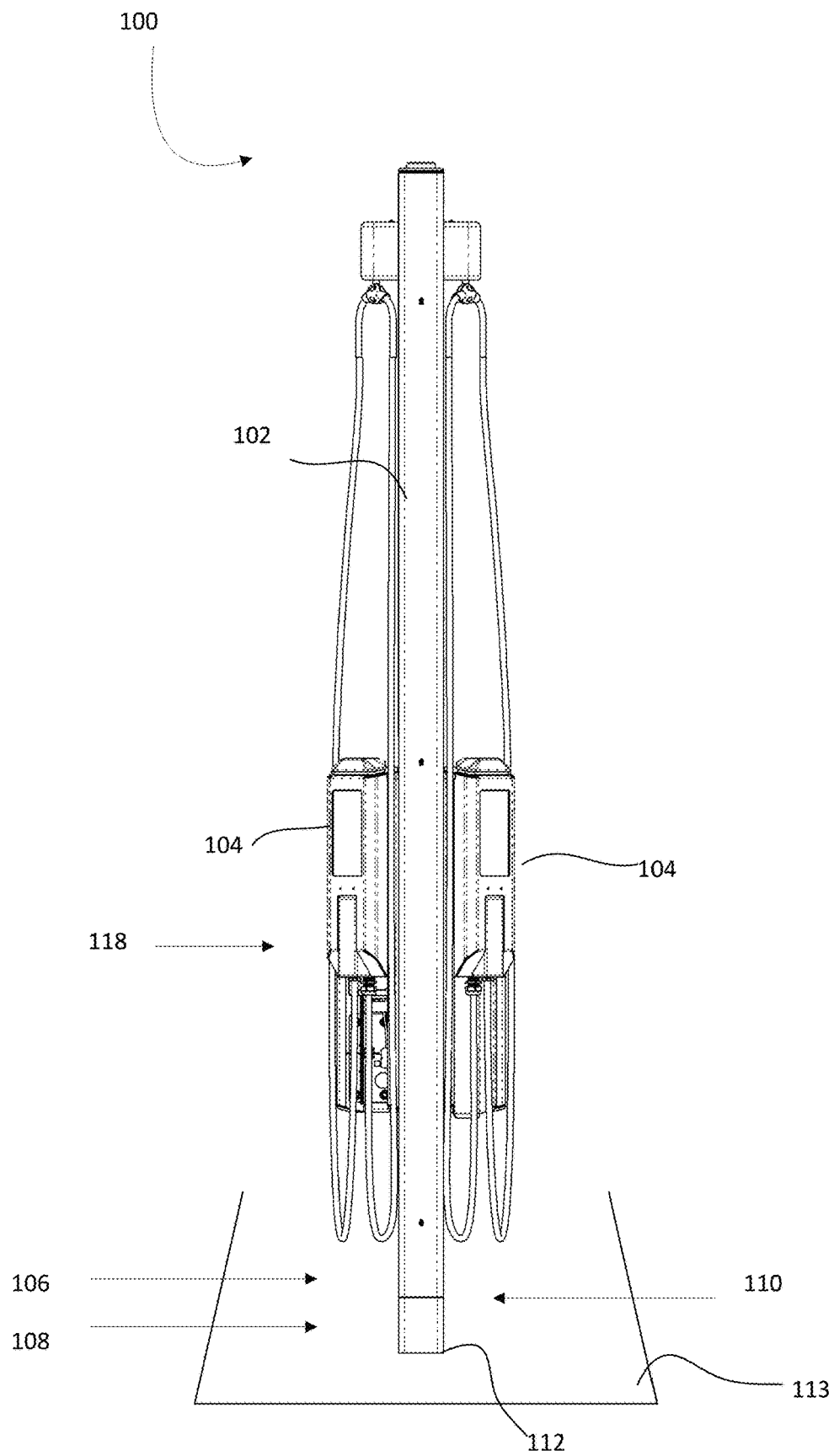
FIG. 2 is a front view of an EV charging station, in accordance with an example of the present application.

FIG. 2 illustrates a front view of an EV charging station 100, in accordance with an example of the present application. As shown in FIG. 2, the EV charging station 100 may include two or more EV chargers 104 mounted to a common charger post 102. An interface section 110 of the post 102 may be situated between the one or more chargers 104 and the curbside base 112 (which, as noted above, may also be referred to as a groundside base, base, or base section).

Figure 3:
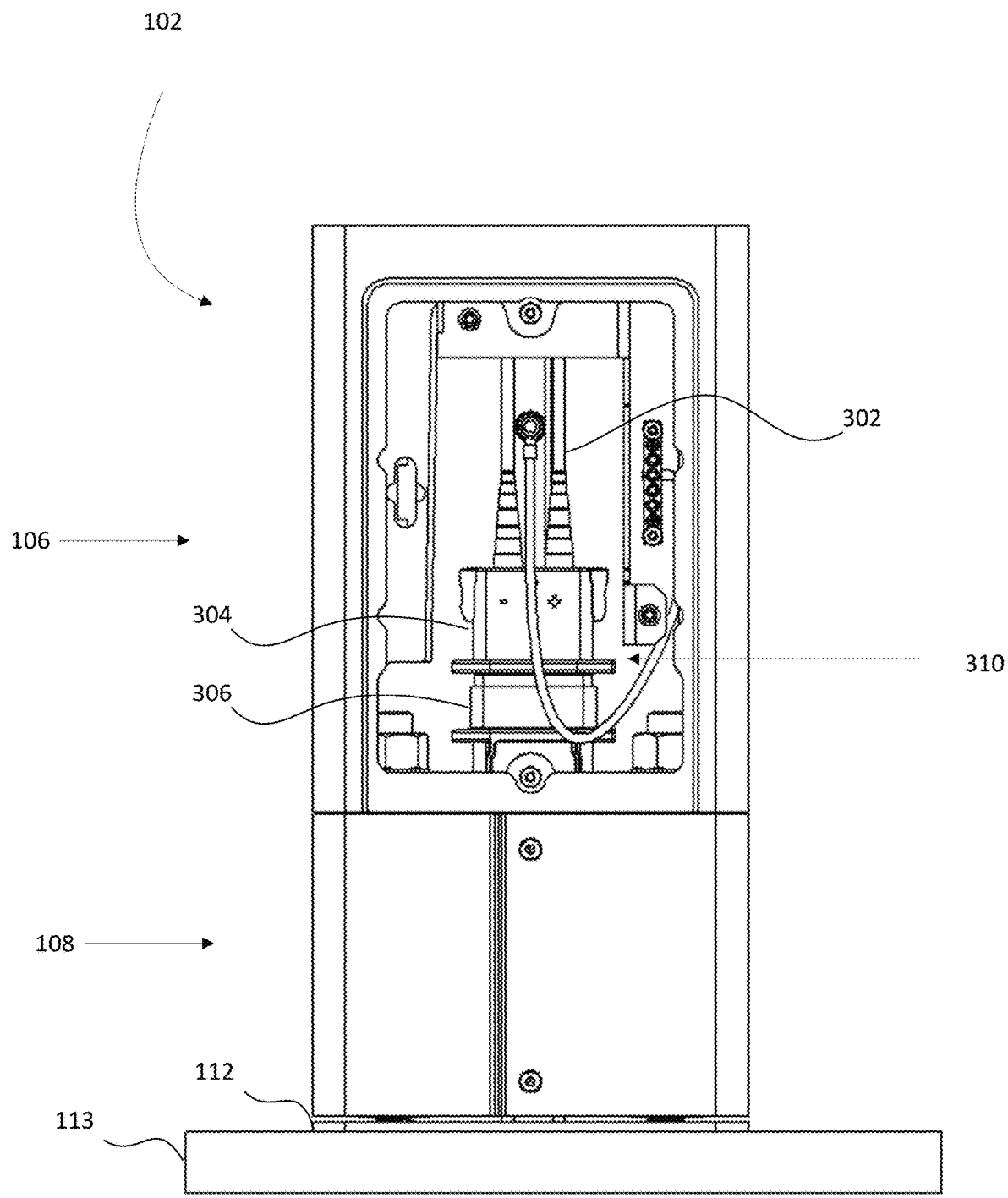
FIG. 3 is a close-up, interior view of an electrical break-away section of an EV charging station, in accordance with an example of the present application.

FIG. 3 illustrates a close-up view of the electrical break-away section 106 within the charging post 102, in accordance with an example of the present application. In the illustrated example, a cover panel has been removed to better illustrate the electrical break-away section 106.

The electrical break-away section 106 is situated to be engaged when the mechanical-break away section 108 is activated. For example, in the illustrated example, the electrical break-away section 106 is situated above the mechanical break-away section 108. As shown, the electrical break-away section 106 includes an electrical break-away coupling 310. The electrical break-away section 106 is arranged to ensure electrical disconnection of the EV charger(s) 104 when a mechanical break-away section 108 breaks apart. That is, the breaking of the mechanical break-away section 108 causes the electrical-break away section 106 to break the electrical connection with the affected EV charger(s).

In the illustrated example, the electrical break-away coupling 310 includes a first electrical connector 304 and a second electrical connector 306. The first electrical connector 304 and the second electrical connector 306 mate together. That is, the first electrical connector 304 and the second electrical connector 306 may matingly engage one another. In this way, the electrical break-away coupling 310 is a mating electrical connector. The mating electrical connector may have a male end and a female end, or each of the connectors may have both male and female connecting features, or the connectors may be genderless. For example, one of the electrical connectors 304, 306 may be a male end and the other of the electrical connectors 304, 306 may be a female end. The male end may be the end that is fixedly connected to the EV charger(s) 104 and the female end may be the end that is coupled to a power supply, such as mains power. For example, the female end may be coupled to a wire and/or cable that is coupled to the power supply. Since the male end may include exposed pins when the electrical connectors 304, 306 are disconnected, it may be preferable that the male end is on the power receiving side and the female end is on the power supply side.

The first electrical connector 304 and the second electrical connector 306 may connect together in a non-locking fashion. That is, the electrical connectors 304, 306 are non-locking connectors. For example, the first electrical connector 304 and the second electrical connector 306 may be slidably disconnected from (and, in at least some implementations, slidably connected to) one another without interference from any locking feature. The term locking feature may include any features that are intended to prevent or impede disconnection of the connectors through a force applied to only a wire associated with one of the connectors. Locking features may include, for example, a threaded locking feature or a locking feature that includes a tab that must be pried from a recess for removal. The electrical connectors 304, 306 do not include a locking feature and they therefore allow for easy disconnection when the mechanical-break away section 108 breaks.

In at least some implementations, the first electrical connector 304 and the second electrical connector 306 may be connected by friction fit. In this way, the first electrical connector 304 may be disconnected from the second electrical connector 306 by simply applying a force to one of the electrical connectors 304, 306 or to a wire associated with one of the electrical connectors 304, 306. For example, the electrical break-away coupling may permit disconnection of the first electrical connector 304 from the second electrical connector 306 (and thus, disconnection of the supply of power to the EV charger(s) 104) when a force of above 40 Lbf is applied to the one of the electrical connectors or a wire that is connected to one of the electrical connectors. That is, a force that is greater than 40 Lbf may, in some implementations, disconnect the electrical connectors 304, 306. For example, a force of 40 Lbf may cause such disconnection to occur. The minimum force for disconnection may vary but the force required for disconnection is generally low. In some implementations, the minimum force may be a force that is within the range of 10 to 40 Lbf.

The electrical break-away coupling may be configured to prevent accidental or unintended disconnection of the electrical connectors 304, 306. For example, the connectors 304, 306 may be configured to prevent disconnection of the electrical connectors 304, 306 through the application of gravitational forces alone. In at least one implementation, the electrical break-away coupling resists disconnection of electrical connectors when a force is applied to one of the electrical connectors (or to a wire associated with one of the connectors) that is less than 10 Lbf.

Other types of non-locking connectors may also be used instead of or in addition to the electrical connectors 304, 306 illustrated in FIG. 3 (and FIG. 4 which will be discussed below). For example, in an implementation, the electrical connectors may be or include magnetic connectors in which a magnetic coupling is used instead of or in addition to a friction fit coupling. For example, one of the electrical connectors 304, 306 may include a magnet and the other of the electrical connectors may include a ferromagnetic material feature or another magnet having a pole that mates with a pole of the magnet on the first of the electrical connectors. Such electrical connectors may disconnect with a force that is sufficiently large to overcome the magnetic force that keeps the connectors together.

When the electrical connectors 304, 306 are connected to one another, they provide electrical connection to the EV charger(s) 104. For example, when they are connected, they provide power to the EV charger(s) 104. The electrical connection may be providing through pins, pads, or the like. For example, one of the electrical connectors 304, 306 may have male electrical connecting features that may be received in female electrical connecting features of the other of the electrical connectors 304, 306. When the electrical connectors 304, 306 are disconnected from one another, the EV charger(s) 104 receive no electrical power.

The electrical break-away coupling 310 connects at least one wire extending from a base section to a charger section. Such wires may also be referred to as cables or electric cables herein. The base section is a portion of the EV charging station that is generally associated with the curbside base 112 (which, as noted above, may also be referred to as a groundside base, base or base section). In at least some implementations, the base section may be or include the curbside base 112. The charger section 118, examples of which are illustrated in FIGS. 1 and 2, is a portion of the EV charging station 100 that is generally associated with the EV charger(s) 104. The charger section may be or include the EV charger(s) 104. The charger section 118 may include a portion of the charger post 102. This portion may be, for example, a portion of the post on which the EV charger(s) are mounted.

Top electric cables 302 are shown in FIG. 3 extending from first electrical connector 304 within charger post 102. Bottom electric cables (not shown in FIG. 3) extend from a bottom one of the electrical connectors 304, 306 to the curbside base 112.

Figure 4:
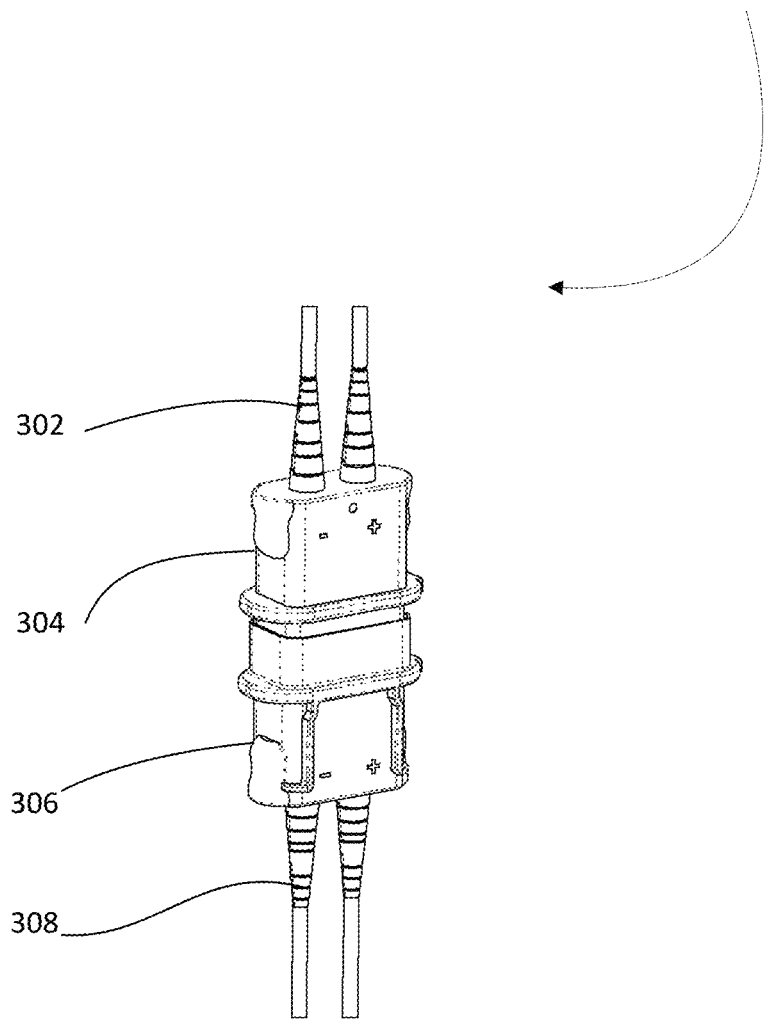
FIG. 4 a perspective view of an electrical break-away coupling, in accordance with an example of the present application.

FIG. 4 shows a close-up view of electrical break-away coupling 310, in accordance with an example of the present application. The electrical break-away coupling 310 includes the first electrical connector 304 and the second electrical connector 306. The first electrical connector 304 and/or the second electrical connector 306 may be male connectors, female connectors or genderless connectors. Top electric cables 302 may be firmly attached to the first electrical connector such that the top electric cables 302 are not designed to be removed from the first electrical connector 304. Bottom electric cables 308 are firmly attached to the second electrical connector 306 such that the bottom electric cables 308 are not designed to be removed from the second electrical connector 306. Top electric cables 302 and bottom electric cables 308 house electric wires.

Figure 5:
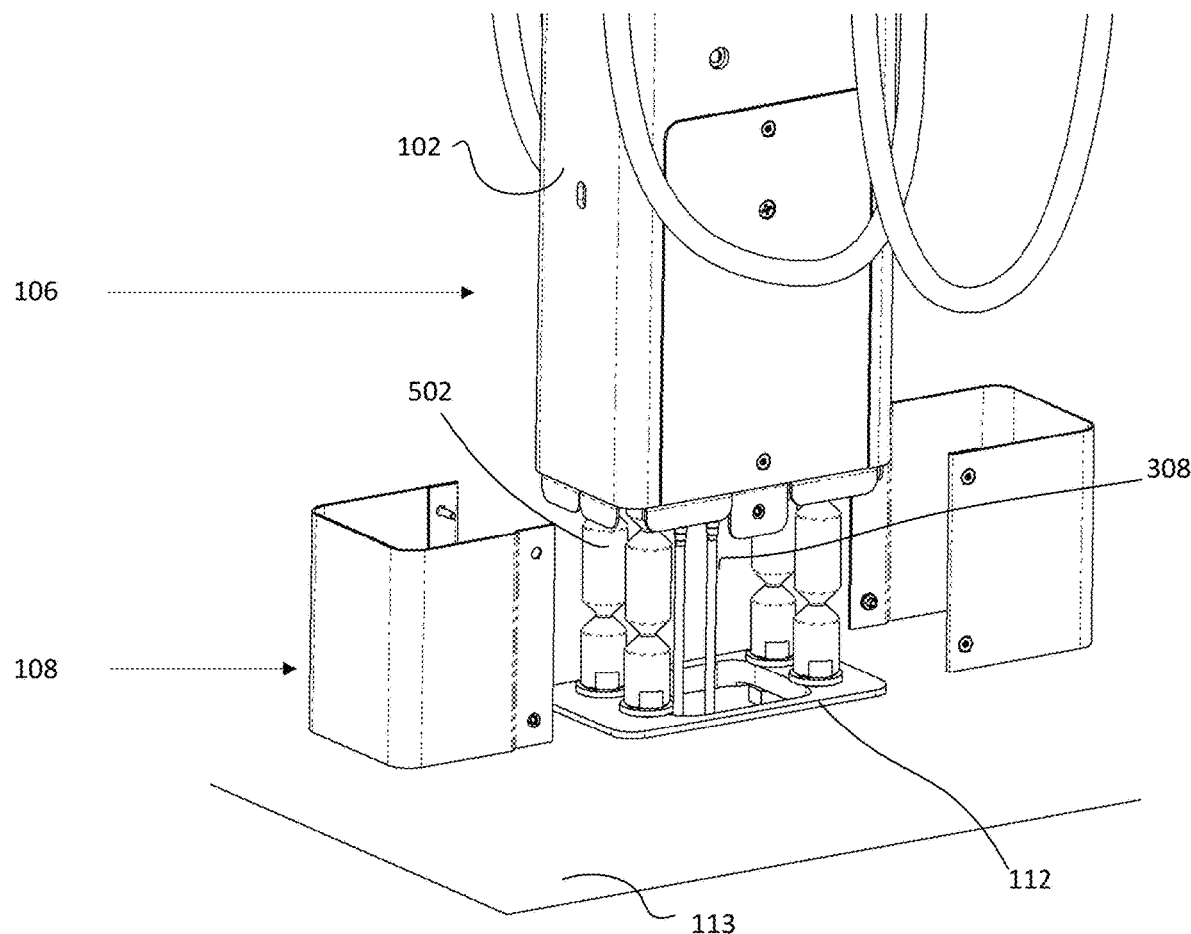
FIG. 5 is a close-up view of a mechanical break-away section of an EV charging station, in accordance with an example of the present application.

FIG. 5 illustrates a close-up view of mechanical break-away section 108 within the charging post 102, in accordance with an example of the present application. The mechanical break-away section 108 is situated to provide a controlled breaking of the electric vehicle charger. For example, the mechanical break-away section 108 may be configured such that the breaking at the mechanical break-away section 108 causes automatic disconnection of the electrical break-away coupling 310. In the illustrated example, the mechanical break-away section 108 is beneath electrical break-away section 106.

As shown, the mechanical break-away section 108 may include one or more mechanical break-away couplings 502. The mechanical break-away section 108 connects a base section, such as the base 112, with a charger section which includes the EV charger 104. The mechanical break-away coupling includes a failure point to allow the charger section to break away from the base section. In the illustrated example, the mechanical break-away section 108 includes four mechanical break-away couplings 502, each of which includes two failure points.

In the illustrated example, each of the mechanical break-away couplings 502 have two necked-down portions to provide preferred failure modes as a function of the position and direction of impact of a force on the charging post 102. In some embodiments, the mechanical break-away couplings 502 are designed such that they will withstand a low-impact speed of less than 5 miles per hour but will fail at high-impact speeds of over 20 miles per hour. In some embodiments, the mechanical break-away couplings 502 are designed such that they will withstand a low-impact speed of less than 5 miles per hour by a 5000 lb vehicle but will fail at high-impact speeds of over 20 miles per hour by a 2500 lb vehicle. Other mechanisms for providing mechanical break-away will be apparent to persons skilled in the art.

The mechanical break-away couplings 502 may be configured to control the direction of fall of the electrical vehicle charging station. The hourglass-shaped portions of the mechanical break-away couplings 502 may help to control the direction of fall. Specifically, these portions allow the EV charging station to fall on top of a vehicle upon impact rather than away from the vehicle, where there may be a pedestrian. In this way, the mechanical break-away couplings 502 may ensure that the charger section breaks away from the base section in a direction of descent corresponding to a side of impact. For example, if a car strikes one side, the charger section will fall towards that side.

Bottom electric cables 308 are shown extending from the curbside base 112 through the mechanical break-away section 108 into the electrical break-away section 106. Due to the position of bottom electric cables 308 within the mechanical break-away section 108 of the charger post 102, all cables will be safely disconnected upon certain impact, i.e., upon certain impact, first electrical connector 304 will become disconnected from second electrical connector 306, thus avoiding the production of any exposed, live wires.

Recall that the electrical break-away coupling connects at least one wire extending from the base section to the charger section and that the electrical break-away coupling is configured to disconnect the at least one wire from the charger section when the charger section breaks away from the base section. That is, the arrangement of the mechanical break-away section 108 and the electrical break away coupling ensures that the electrical break away coupling is engaged to break the electrical connection when the mechanical break-away section 108 is engaged. For example, the bottom electrical connector 306 may be fixed to the base 112 through direct or indirect connection (e.g. through connection of the cables 302, 308 or via another type of connection) whereas the top electrical connector 304 may be fixed to the charger section and/or the EV charger through direct or indirect connection. In this way, any movement of the charger section and/or EV charger relative to the base 112 causes a force to be applied to the electrical connectors 304, 306 to pull the electrical connectors 304, 306 apart from one another. In this way, the electrical connectors disconnect through impact of a vehicle.

Conveniently, electrical disconnection is achieved through a controlled mechanical disconnection. This may avoid the need to use a sensor such as an impact sensor that actively attempts to identify a collision through sensed activity and that actively attempts to shut off the EV charger when a collision is sensed. A disconnect that requires control based on a sensed condition may fail in certain situations, such as a situation in which a wire associated with a communication bus or other control signal path may be severed during the collision before action is taken based on the sensed impact.

The mechanical break-away couplings may be arranged such that the failure points are below a bumper height for a roadway. The roadway may be, for example, a road, a parking lot or another surface upon which a vehicle may travel. In at least some implementations, one or more of the failure points may be within six inches of a bumper height for a roadway. The bumper height is a height of a bumper on a typical vehicle. The bumper height may be in the range of sixteen and twenty inches measured from a road surface.

Figure 6:
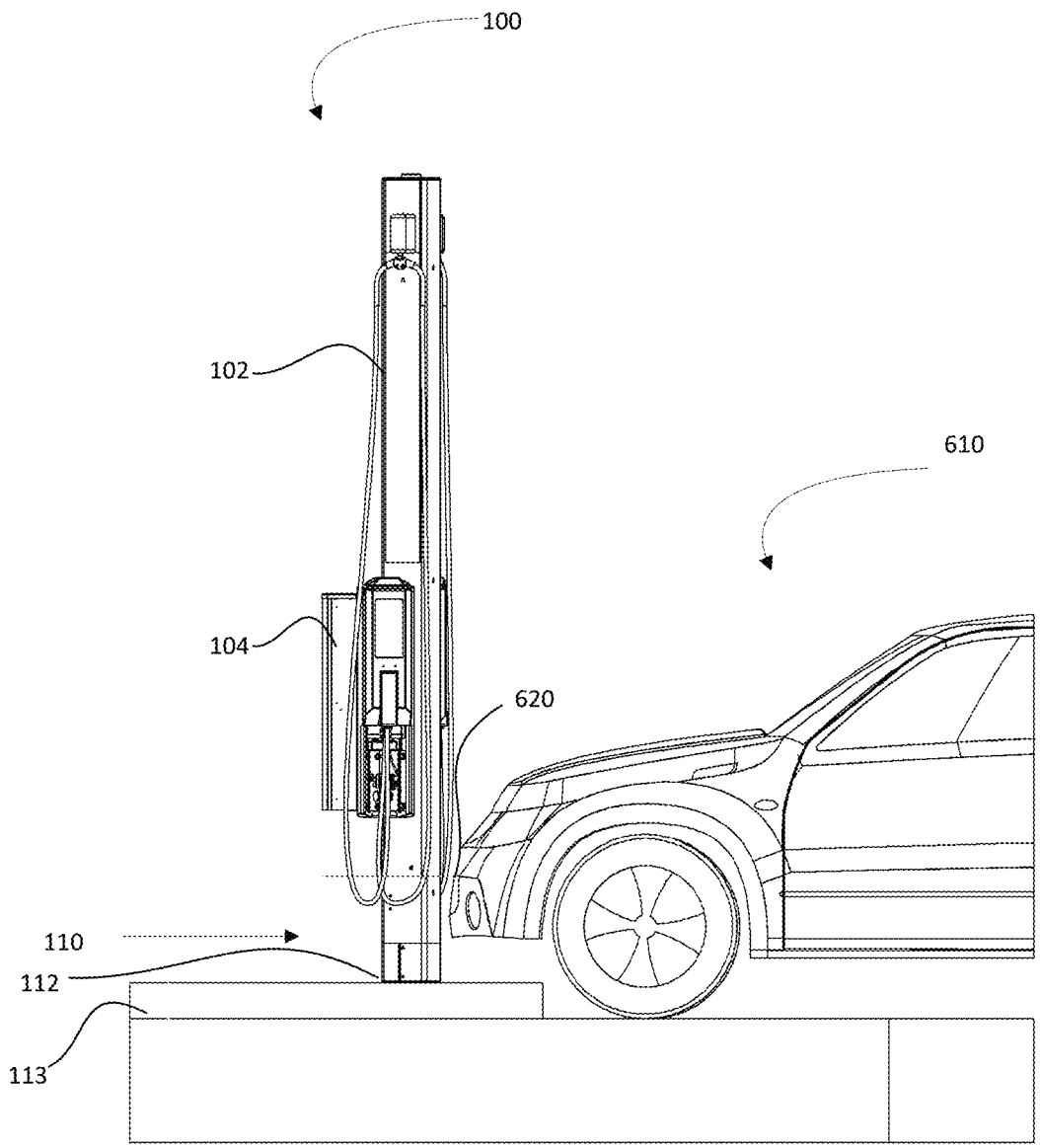
FIG. 6 is a side view of an EV charging station adjacent to a vehicle, in accordance with one example of the present application.

Reference is now made to FIG. 6, which illustrates a side view of an EV charging station 100 adjacent to a vehicle 610, in accordance with an example of the present application. The EV charging station 100 includes the charger post 102 and one or more chargers 104. The charger post 102 is supported by the curbside base 112.

The charger post 102 is positioned such that the interface section 110 aligns with the potential "point of impact" of vehicle bumper 620. The interface section 110 is thus positioned in a manner enabling mechanical and electrical break-away upon certain impact by vehicle 610. In some embodiments, the design location of the interface section 110 may be determined by subtracting the height of the sidewalk from a bumper height. For example, an average passenger vehicle bumper height may be 24 inches and the height of a sidewalk from a road may be 6 inches. In such an example, the interface section 110 may be positioned at 18 inches above the base of the charger post.

Figure 7:
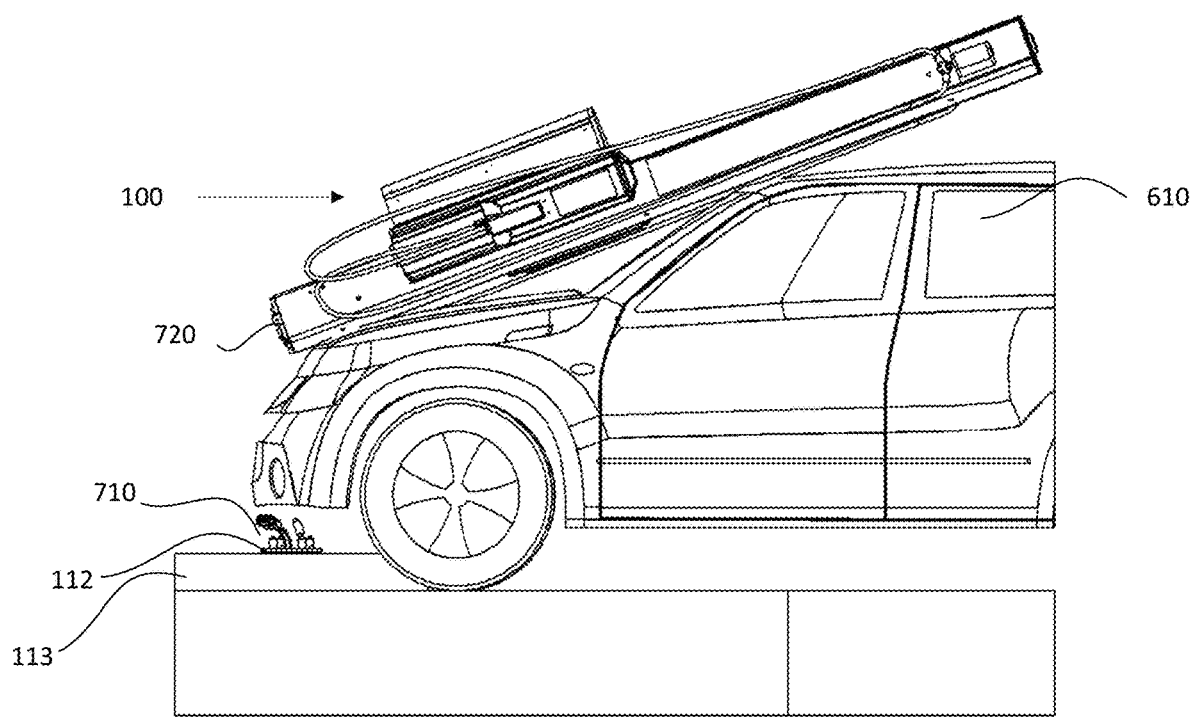
FIG. 7 is a side view of an EV charging station and a vehicle after impact, in accordance with one example of the present application.

FIG. 7 shows an EV charging station 100 after a high-speed impact with vehicle 610. The mechanical break-away couplings 502 failed, resulting in the safe disconnection of electrical break-away coupling 310 and the physical breaking of EV charging station 100 around the point of impact. The EV charging station 100 rests upon the vehicle 610, having fallen in a direction that corresponds to the side of the impact. EV charging station interface section remnant 710 remains attached to the curbside base 112.

It may be seen that, by configuring the mechanical break away couplings to cause the EV charging station to fall upon the vehicle, an end 720 that was previously coupled to the base 112 through the mechanical break-away couplings 502 is raised upward. Specifically, impact the vehicle causes the broken-away EV charging station to fall upon the vehicle, creating a pivoting effect where the end 720 is raised. This causes the electrical connectors 304, 306 to disconnect from one another.

Figure 8:
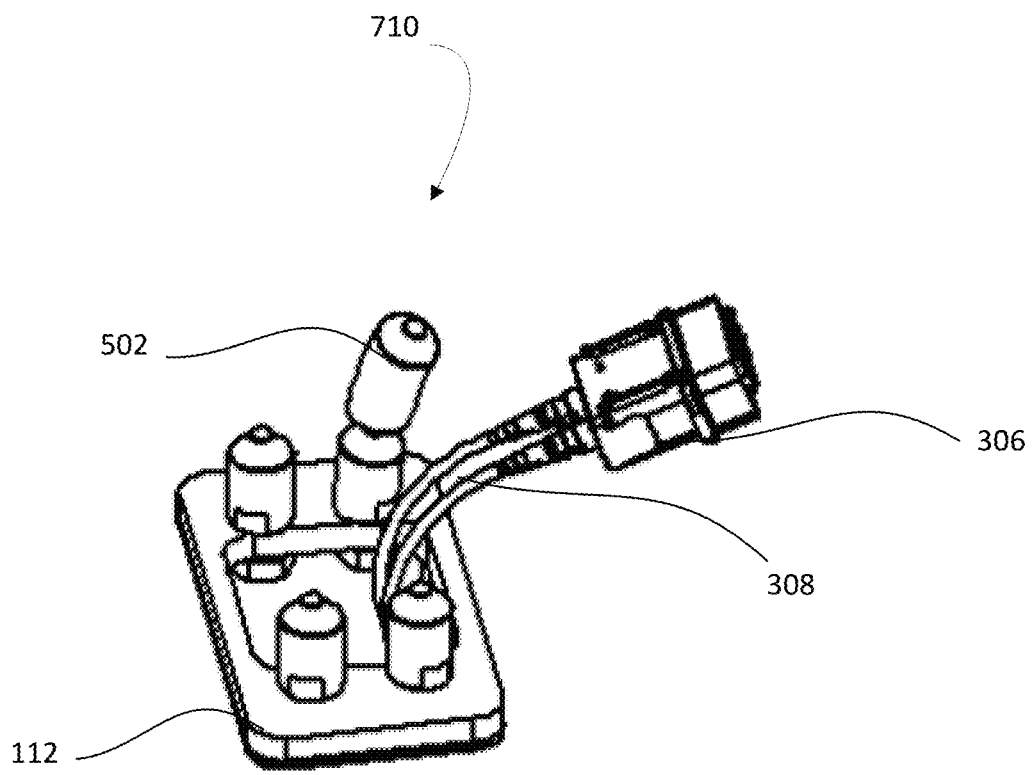
FIG. 8 is a perspective view of an EV charging station interface section remnant, in accordance with one example of the present application.

FIG. 8 provides a close-up, perspective view of EV charging station interface section remnant 710. The remnant 710 is the portion of the EV charging station that remains coupled to the ground after impact of the vehicle. The remnant 710 includes bottom sections of mechanical break-away couplings 502. As shown, the mechanical break-away couplings 502 have broken upon impact. The remnant 710 also includes the second electrical connector 306 and the bottom electric cables 308, which remain fixedly coupled to the ground, and thus to the base 112. As shown, the second electrical connector 306 has separated from first electrical connector 304 (not shown) upon impact.

Figure 9:
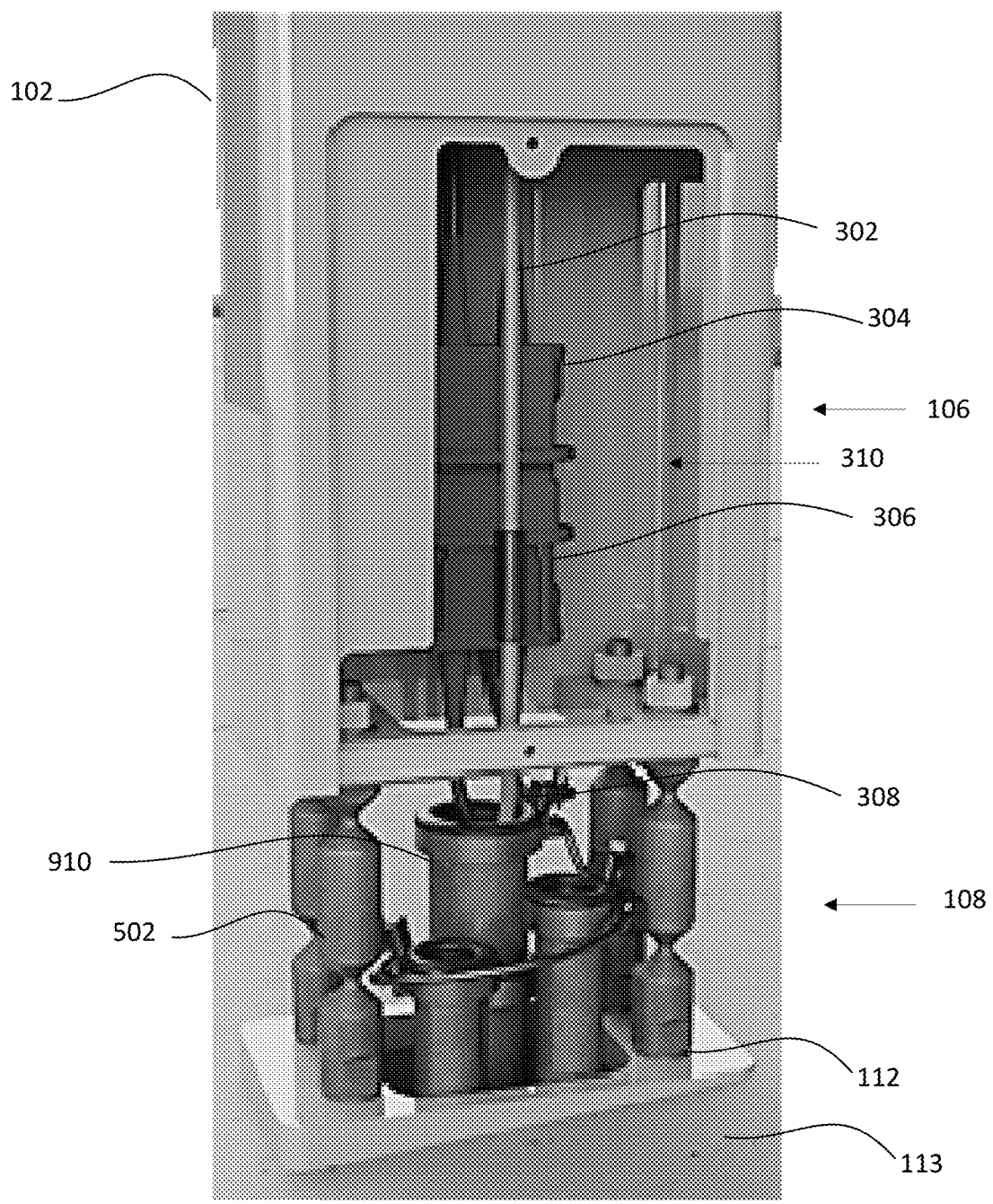
FIG. 9 is a perspective view of an interface section of an EV charging station, illustrating an electrical break-away section and a mechanical break-away section, in accordance with one example of the present application.

FIG. 9 provides a close-up view of the charger post 102 in accordance with an example of the present application. The charger post 102 is mounted to curbside base 112. The curbside base 112 may be a concrete foundation.

The electrical break-away coupling 310 is shown within an electrical break-away section 106. The electrical break-away coupling 310 may include the first electrical connector 304 and the second electrical connector 306, which may be of a type described above. For example, the first electrical connector 304 and second electrical connector 306 may mate to one another in a non-locking fashion. Top electric cables 302 may extend from first electrical connector 304 and bottom electric cables 308 may extend from second electrical connector 306. The top electric cables 302 and bottom electric cables 308 house electric wires.

The mechanical break-away section 108 includes one or more mechanical break-away couplings 502, which may be as described above. For example, each of the mechanical break-away couplings 502 may have two necked-down portions to provide preferred failure modes as a function of the position and direction of impact of a specific force on the charger post 102.

In this example, an open conduit 910 is mounted to extend from a base section, such as the curbside base 112, and is disposed below electrical break-away section 106. The open conduit 910 extends towards a charger section. The open conduit 910 may extend 6 inches or more from the curbside base 112.

As shown, the bottom electric cables 308 are routed through the open conduit 910 from the base 112 towards the electrical break-away section 106. Upon certain impact, the mechanical break-away couplings 502 will fail, causing the charger post 102 to fall onto the vehicle (not shown). The falling of charger post 102 may cause the upper one of the connectors 304, 306 to be pulled away from the bottom electric cables 308 (and also pulled away from the bottom one of the connectors 304, 306). Before disconnection will occur, any slack in the wires must first be taken up. The conduit 910 may serve to aid in the take up of any such slack. For example, since the broken-away section of the EV charging system may not move straight upward as it breaks apart (or, put differently, since the broken-away portion will move laterally as it breaks away) after mechanical disconnection, the bottom electric cables 308 may pivot about the open end of the conduit 910, which may accelerate the disconnection of first electrical connector 304 from second electrical connector 306 by effectively taking up the slack in the electric cables more quickly (i.e., with lesser movement of the broken-away portion of the EV charging station), expediting the safe de-energization of the EV charging station.

The open conduit 910 may also serve to help protect the bottom electric cables 308.

As noted above, the amount of slack in the electrical cables 302, 308 may affect the speed of disconnection. Accordingly, the wires in any of the embodiments described herein may, when connected to one another through the electrical connectors 304, 306 have very little slack. For example, when the electrical connectors 304, 306 are conducted, any attached wires may have less than three inches of slack in some implementations to cause immediate disconnection of the wires when the charger section breaks away from the base section.

Figure 10:
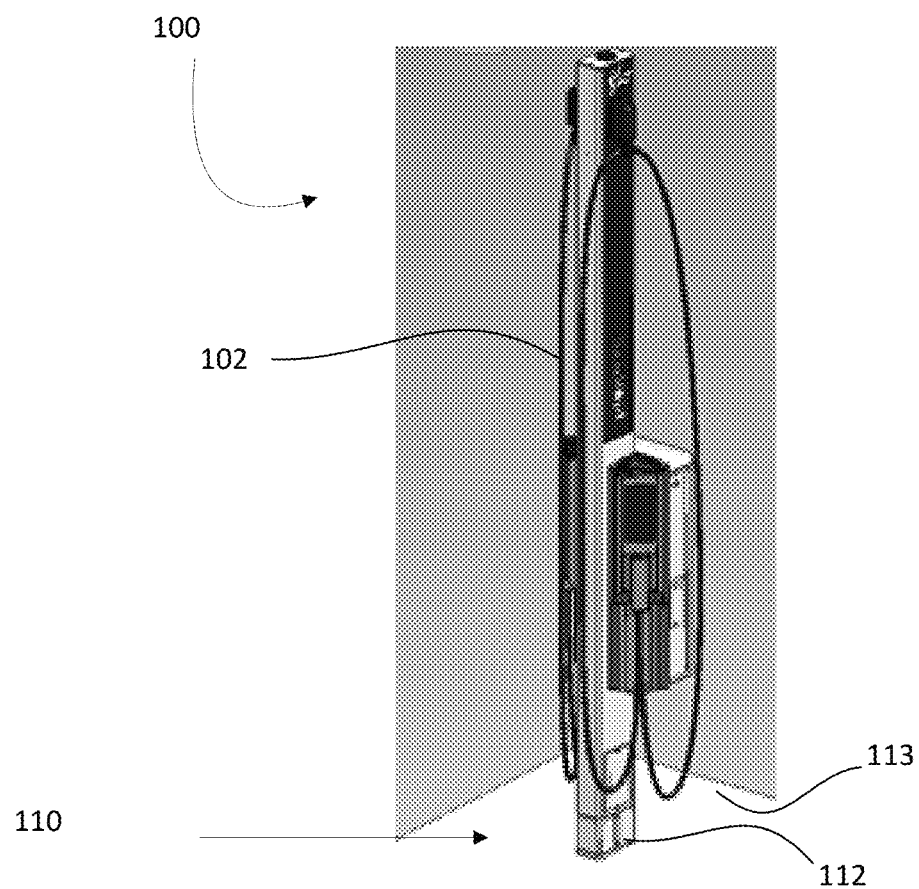
FIG. 10 is a perspective view of an EV charging station base beneath an EV charging station, in accordance with one example of the present application.
Figure 10:
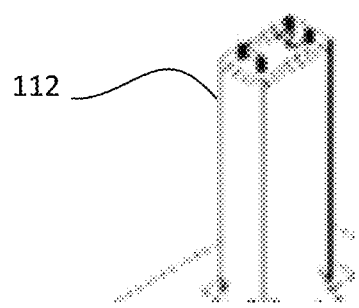

Reference is now made to FIG. 10, which illustrates curbside base 112 for an EV charging station 100, in accordance with an example of the present application. As described with reference to FIG. 6, it may be desirable to position the charger post 102 such that the interface section 110 aligns with a vehicle bumper in a manner enabling mechanical and electrical break-away upon certain impact. In some embodiments, it may therefore be desirable to adjust the height of the charger post 102 so that the interface section 110 may be positioned at an average passenger vehicle bumper height. The curbside base 112 may be used for this purpose. The curbside base 112 may be secured, for example, in-ground below the charging station 100.

The curbside base 112 may, therefore, form part of the base section of the EV charging station 100.

In accordance with one example of the present application, there is provided an EV charging station pedestal. An EV charging station pedestal provides a means of adapting a third-party, existing and/or traditional EV charging station for safety. An EV charging pedestal may include a curbside base 112 securely attached beneath a pedestal interface section. The pedestal interface section includes elements of the mechanical break-away section and the electrical break-away section described herein such that the third-party EV charging station may be operably connected atop the pedestal. In this way, the safety of a third-party, existing and/or traditional EV charging station may be improved.

The EV charging stations described herein may, in at least some implementations, be connected to back-end infrastructure. Such back-end infrastructure may be used to, for example, manage such EV charging stations. In at least some implementations, a processor associated with a system of the back-end infrastructure may be configured to detect that an impact at an EV charging station may have occurred. For example, the EV charging station may be configured to periodically send to the system of the back-end infrastructure a heartbeat signal and the system may monitor for the heartbeat signal. If the system does not receive the heartbeat signal for at least a threshold time period, then the system may determine that an impact may have occurred. In some instances, instead of the EV charging station sending the heartbeat signal automatically, the system associated with the back-end infrastructure may periodically ping the EV charging station and await a response. If no response is received, the system may determine that an impact may have occurred.

When the system associated with the back-end infrastructure determines that an impact may have occurred, it may take any one of a number of possible actions including, for example, de-activating nearby EV charging stations, dispatching emergency services or a repair person, etc.

The electrical and mechanical break-away equipment that is described herein may, in some instances, be used with other types of roadside electrical infrastructure. For example, transformer stations that are installed on or near a road may include the electrical and mechanical break-away equipment described herein to ensure safe disconnection of electrical power upon impact. By way of further example, streetlights, lamp posts, electrical signage, or other electrical equipment may be equipped with the break-away features described herein.

As noted, certain adaptations and modifications of the described embodiments can be made. Therefore, the above discussed embodiments are considered to be illustrative and not restrictive.

What is claimed is:

1. An electric vehicle charging station configured to safely disconnect power during an impact, the electric vehicle charging station including:

a mechanical break-away coupling connecting a base section and a charger section, the mechanical break-away coupling including a failure point to allow the charger section to break away from the base section;

an electrical break-away coupling connecting at least one wire extending from the base section to the charger section, the electrical break-away coupling configured to disconnect the at least one wire from the charger section when the charger section breaks away from the base section; and an open conduit for routing the at least one wire, the open conduit extending above-ground from the base section towards the charger section, an end of the open conduit nearest the charger section opening into a region associated with the mechanical break-away coupling and creating a pivot for the at least one wire to accelerate the disconnection of the at least one wire from the charger section.

2. The electric vehicle charging station of claim 1, wherein the failure point is disposed within six inches of a bumper height for a roadway.

3. The electric vehicle charging station of claim 1, wherein the electrical break-away coupling comprises a non-locking connector.

4. The electric vehicle charging station of claim 1, wherein the electrical break-away coupling is a mating electrical connector having a male end coupled to the charger section and a female end coupled to the at least one wire.

5. The electric vehicle charging station of claim 1, wherein the at least one wire includes no more than three inches of slack to cause immediate disconnection of the at least one wire when the charger section breaks away from the base section.

6. The electric vehicle charging station of claim 1, wherein the at least one wire is coupled to the base section.

7. The electric vehicle charging station of claim 1, wherein the electrical break-away coupling causes disconnection of the at least one wire from the charger section when a force is applied to the at least one wire that is above 40 Lbf.

8. The electric vehicle charging station of claim 1, wherein the electrical break-away coupling resists disconnection of the at least one wire from the charger section when a force is applied to the at least one wire that is less than 10 Lbf.

9. The electric vehicle charging station of claim 1, wherein the charger section breaks away from the base section in a direction of descent corresponding to a side of impact.

10. A pedestal for an electric vehicle charging station configured to safely disconnect power to the electric vehicle charging station during an impact to the pedestal, the pedestal including:

a base section;

an interface section for connecting the base section to the charging station, the interface including:

a mechanical break-away coupling including a failure point to allow the charging station to break away from the base section;

an electrical break-away coupling for connecting at least one wire extending from the base section to the charging station, the electrical break-away coupling configured to disconnect the at least one wire from the charging station when the charging station breaks away from the base section; and an open conduit for routing the at least one wire, the open conduit extending above-ground from the base section towards the charger section, an end of the open conduit nearest the charger section opening into a region associated with the mechanical break-away coupling and creating a pivot for the at least one wire to accelerate the disconnection of the at least one wire from the charger section.

11. The pedestal of claim 10, wherein the failure point is disposed within six inches of a bumper height for a roadway.

12. The pedestal of claim 10, wherein the electrical break-away coupling comprises a non-locking connector.

13. The pedestal of claim 10, wherein the electrical break-away coupling is a mating electrical connector having a male end coupled to the at least one wire and a female end coupled to the electric vehicle charging station.

14. The pedestal of claim 10, wherein the at least one wire includes no more than three inches of slack to cause immediate disconnection of the at least one wire from the electric vehicle charging station when the charging station breaks away from the base section.

15. The pedestal of claim 10, wherein the at least one wire is coupled to the base section.

16. The pedestal of claim 10, wherein the electrical break-away coupling causes disconnection of the at least one wire from the electric vehicle charging station when a force is applied to the at least one wire that is above 40 Lbf.

17. The pedestal of claim 10, wherein the electrical break-away coupling resists disconnection of the at least one wire from the electric vehicle charging station when a force is applied to the at least one wire that is less than 10 Lbf.

18. The pedestal of claim 10, wherein the charging station breaks away from the base section in a direction of descent corresponding to a side of the impact.

* * * * *